$$n = \omega RC = 2\pi f RC$$
$$ga = \frac{1}{1+jn}$$

$$gb = \frac{jn}{1+jn}$$

$$gc = \frac{1}{1-n^2+3jn}$$

$$gd = \frac{-n^2}{1-n^2+3jn}$$

$$ge = \frac{jn}{1-n^2+3jn}$$

INVENTOR
Walter H. Wirkler

April 10, 1951 W. H. WIRKLER 2,548,278
AIRCRAFT COURSE STABILIZING MEANS
Filed Aug. 17, 1949 9 Sheets-Sheet 3

INVENTOR
Walter H. Wirkler

INVENTOR
Walter H. Wirkler

INVENTOR
Walter H. Winkler

April 10, 1951 W. H. WIRKLER 2,548,278
AIRCRAFT COURSE STABILIZING MEANS
Filed Aug. 17, 1949 9 Sheets-Sheet 9
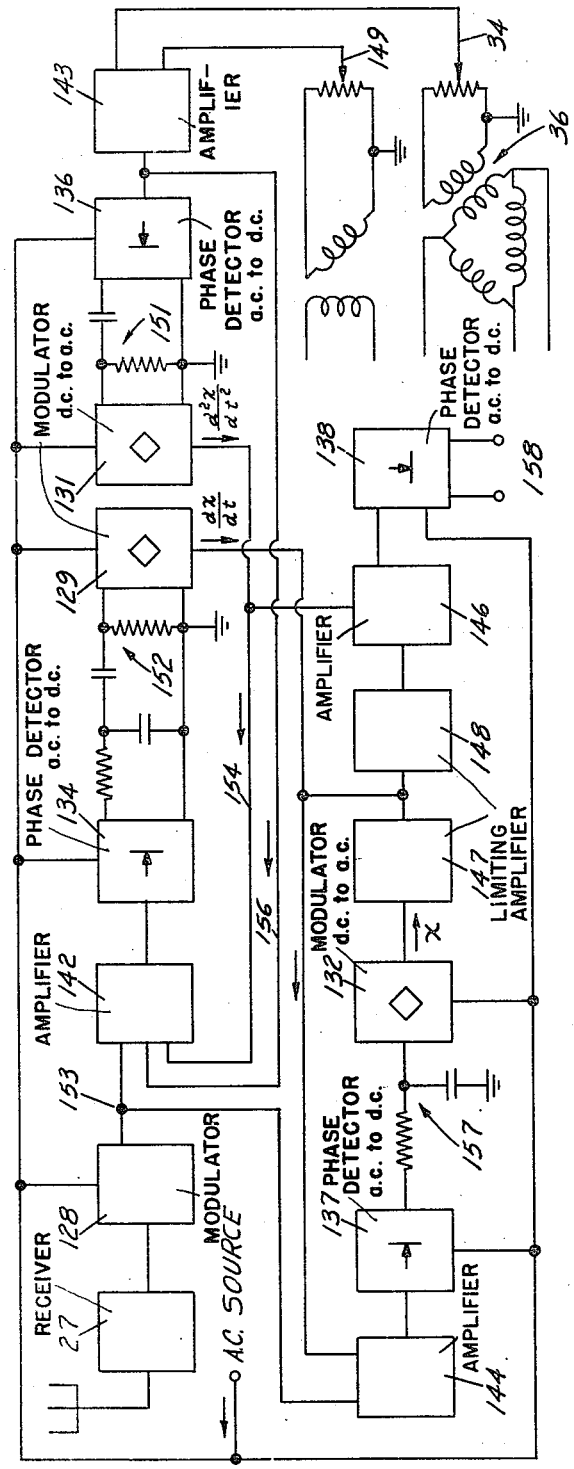
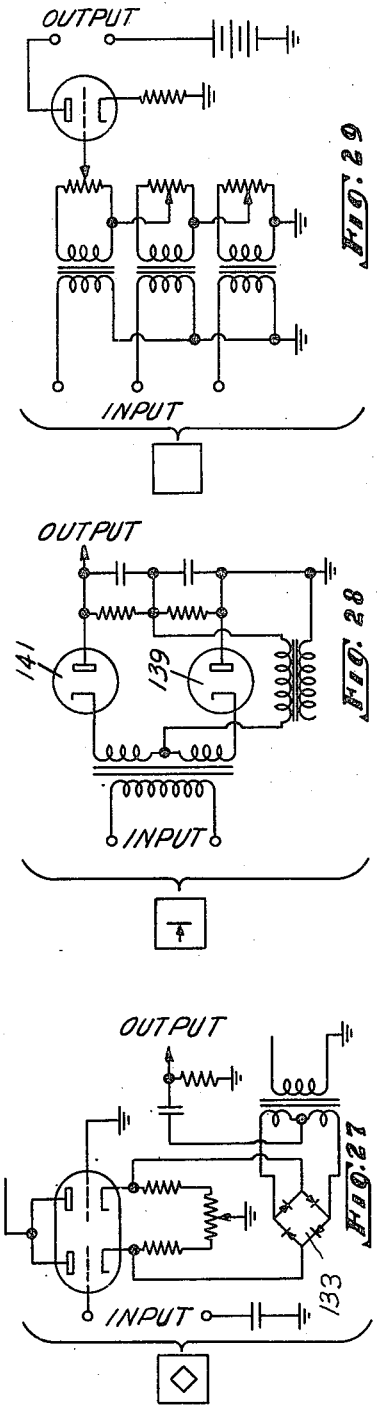
INVENTOR
Walter H. Wirkler

UNITED STATES PATENT OFFICE 2,548,278

AIRCRAFT COURSE STABILIZING MEANS

Walter H. Wirkler, Cedar Rapids, Iowa, assignor to Collins Radio Company, Cedar Rapids, Iowa, a corporation of Iowa Application August 17, 1949, Serial No. 110,826

33 Claims. (Cl. 343—107)

This invention relates broadly to the steering of aircraft, and more particularly to controlling the flight path so as to approach and coincide with a fixed beam of radio signals.

The broad object of this invention is to derive from the beam by means of a receiver aboard the aircraft various reference signals essentially proportional to the lateral displacement of the aircraft from the beam and to the various time derivatives of this displacement, and to control the flight of the aircraft in accordance with these various reference signals.

The more particular object of this invention is to derive the reference signals from the radio signal and from other signals obtained aboard the aircraft so as to minimize the perturbing effects due to bends and transient disturbances of the beam and also to minimize the perturbing effects of wind components perpendicular to the beam.

A further object of this invention is to provide means for measuring the lateral acceleration of the aircraft by means including a piezoelectric crystal accelerometer.

Still another object is to provide a system for controlling an aircraft which will bring the aircraft on to the beam and keep it there without allowing the aircraft to oscillate about the course.

To provide an aircraft course stabilizing system which utilizes unidirectional and relatively low frequency components derived from the radio signal and relatively higher frequency components derived from other sources is another object of this invention.

Other objects, features and improvements of this invention will become apparent from the specification and drawings in which:

Fig. 26 is a wiring diagram illustrating a system for obtaining and combining deviation, velocity, and acceleration of an aircraft perpendicular to a beam of radiant energy;

Fig. 27 is a wiring diagram of a modulator for converting D. C. to A. C.

Fig. 28 is a wiring diagram of a phase detector for converting A. C. to D. C.; and Fig. 29 is a wiring diagram of wiring amplifiers which may be used for combining several A.-C. input signals.

Figure 1:
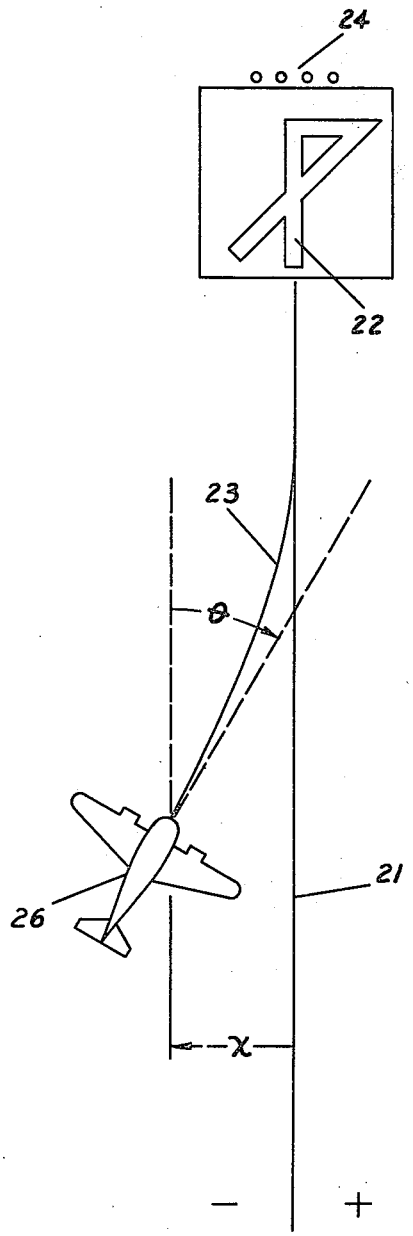
Fig. 1 is a top view showing an airplane which it is desired to land on an airport under conditions which render the airport invisible to the pilot of the airplane.

Although the principles of this invention are applicable to other beam-riding control systems such as required for following a glide path, for example, the problem used here for purpose of illustration is that of following a runway localizer beam, as shown in Figure 1. Here localizer beam 21 is aligned with runway 22 on the landing field. The flight path 23 of the aircraft is to be controlled so as to approach and coincide with 21 as nearly as possible. For this purpose the localizer 24 transmits a signal of polarity and magnitude proportional to $x$, the lateral deviation of the aircraft 26 from the radio beam 21, derived by radio equipment aboard the aircraft. This signal is designated by the quantity $Ax$. Although the characteristics of the radio beam and the receiving equipment are usually such that the factor $A$ changes with distance from the beam-projecting transmitting station, it is assumed here that the equipment is modified to take into account the approximate distance to the station so that $A$ may be considered constant.

Figure 2:
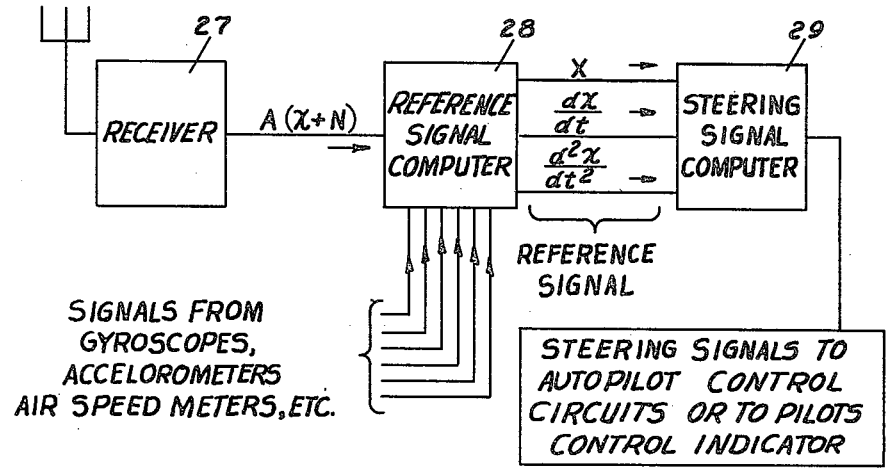
Fig. 2 is a schematic illustration of the general problem to which this invention relates.

The general situation is illustrated in Figure 2. Receiving equipment 27 derives from the radio beam the desired signal $Ax$ along with an undesired signal $N$ due to beam fluctuations. The signal ($Ax+N$) is applied to reference-signal computing means 28 along with other signals derived from gyroscopes, accelerometers, airspeed meters and the like. In this computer 28 these various signals are combined according to the principles of this invention so as to derive reference signals proportional to $x$, $$\frac{dx}{dt}, \frac{d^2x}{dt^2}$$

and possibly still higher time derivatives of $x$.

Based on the reference signals supplied from the computer 28, steering computer 29 derives the proper steering signals required to make the course of the aircraft approach and remain on the beam. Meanwhile, the attitude of the aircraft is stabilized by an autopilot responsive to, say, rate of turn gyros on the various axes, or by a human pilot responsive to gyro flight instruments so that the aircraft is restrained from changing attitude except when steering signals are present. These steering signals may then be applied to the autopilot circuit or to a pilot's control indicator for the guidance of the human pilot.

To bring out more clearly what is needed in the control system, it should be recalled that the basic problem is how to bring the aircraft to the center of the beam quickly and keep it there. Mathematically, the problem is to make $x=0$, where $x$ is the lateral displacement from the beam. To do this, the lateral acceleration of the aircraft, $$\frac{d^2x}{dt^2}$$

is controlled as by banking or skidding. The steering computer 29 is a device which figures out what $$\frac{d^2x}{dt^2}$$

should be to best solve the problem and then makes the autopilot actuate the controls until $$\frac{d^2x}{dt^2}$$

takes the required value. Alternatively, the steering computer 29 may actuate an indicator which shows the human pilot the difference between what $$\frac{d^2x}{dt^2}$$

is and what it should be, so that the pilot may actuate the controls to make the indicator read zero. Obviously, the steering computer 29 must have supplied to it information as to the actual values of $x$ and $$\frac{d^2x}{dt^2}$$

but it turns out that this is not enough. Information as to the value of $$\frac{dx}{dt}$$

is needed also so that it can anticipate coming onto the beam and avoid overshooting, since the object is to make $$\frac{dx}{dt}$$

zero when $x$ is zero. In addition, because of the time required to change the attitude of the aircraft so as to change $$\frac{d^2x}{dt^2}$$

the computer 29 might make use of still higher derivatives such as $$\frac{d^3x}{dt^3}$$

in order to anticipate the requirement for a change in $$\frac{d^2x}{dt^2}$$

The steering computer 29 thus requires accurate information as to $x$ and at least the first and second time derivatives of $x$. It does not need time integrals of $x$ if the information as to the present value of $x$ and its derivatives is accurate.

The steering computer circuits may be of the most elementary form in which signals proportional to $x$, $$\frac{dx}{dt}$$

and $$\frac{d^2x}{dt^2}$$

are merely added together to actuate a turn control or pilot's control indicator, and the resulting course in approaching the beam is an exponential curve or a damped sinusoidal oscillation, depending on the circuit adjustment. This is not necessarily the best approach path to the beam. A more elaborate computer might be desired which establishes an approach path consisting of a straight line and a circle arc tangent to the line and to the beam, for example. No matter what the form of the computer, the information it needs is still $x$ and its time derivatives, however.

If a signal could be derived from the beam always accurately proportional to $x$, this signal could be used in the computer directly and its derivatives could be obtained by means of differentiating circuits. Because of various irregularities in the beam, however, this signal contains perturbing components which are mostly of rather high frequency. The differentiating circuits accentuate the higher-frequency perturbing components to such an extent that an extremely straight and steady beam is required if good control of the flight path is to be achieved by making use of the higher-order time derivatives of the beam displacement signal. It is not possible to solve this problem satisfactorily by applying low pass filter circuits to the radio signal for rejecting the high-frequency noise components, because the signals representing $x$ and its derivatives are then in error because the higher frequency components are not present in the proper phase and amplitude and the performance of the system is impaired.

The signal proportional to $$\frac{d^2x}{dt^2}$$

need not be obtained from the radio signal, since it can be supplied directly from a transverse linear accelerometer carried aboard the aircraft. Alternatively, it might be obtained from a gyroscope measuring bank angle or rate of turn, but this signal is in error if there is any skid, slip or changing cross-wind component. Similarly, a signal proportional to $$\frac{dx}{dt}$$

could be obtained from the known air speed and from a gyroscope measuring heading departure from the beam, but this signal is in error if there is any cross-wind component at all.

If a signal proportional to $$\frac{d^2x}{dt^2}$$

were available from a gyro-oriented linear accelerometer, it might seem that $$\frac{dx}{dt}$$

and $x$ could be obtained simply by integrating this signal. However, this is impractical for two reasons. First, accidental errors in the acceleration signal and in the integrating device are cumulative over the whole period of integration, so that accelerometers and integrators precise enough to obtain the low frequency components of $$\frac{dx}{dt}$$

and $x$ accurately are hardly conceivable. Second, the integrated signal so obtained would depend not only on the integration but on the initial conditions at the start of the integrating period. This means that $x$ and $$\frac{dx}{dt}$$

as well as $$\frac{d^2x}{dt^2}$$

would have to be known very accurately at the moment the integrators are started.

The basic principle of this invention is to obtain the higher frequency components of each reference signal from a source other than the radio signal $Ax$ and to obtain the lower frequency components from $Ax$. For example, the high frequency components of $$\frac{dx}{dt}$$

might be obtained by integrating the acceleration signal $$\frac{d^2x}{dt^2}$$

and the lower frequency components by differentiating the radio signal $Ax$. An integrator which is effective on the high frequency components only might be thought of as having a short memory. That is, it accumulates the signal to be integrated all right but keeps losing it after a while. The result is that it does not remember past mistakes very well, and eventually forgets all about the initial conditions. Meanwhile the information which the integrator loses is made good as fast as it is lost by means of an imperfect differentiator operating from the radio signal. An imperfect differentiator which is effective on the low frequency components only might be thought of as determining the low frequency components of $$\frac{dx}{dt}$$

by observing the general trend in the change of $x$, but ignoring the high frequency components contained in short period transient disturbances.

In Figs. 3 to 7 inclusive are shown five filter circuits useful in accomplishing the objects of this invention.

For convenience the filters will be given the following designations:

Filter in Fig. 3—low pass
Filter in Fig. 4—high pass
Filter in Fig. 5—two section low pass
Filter in Fig. 6—two section high pass
Filter in Fig. 7—band pass The above designations will be used hereinafter in the description and claims.

The transfer function of a filter is here defined as the open circuit output voltage divided by the input voltage.

Figure 3:
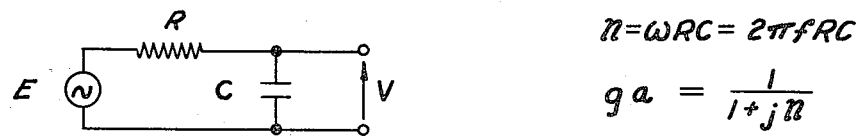
Fig. 3 is a wiring diagram of a low pass filter.

The transfer functions of the filters are:

Filter in Fig. 3—$g_a = \dfrac{1}{1+jn}$

Figure 4:
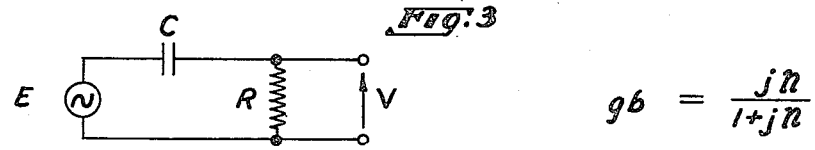
Fig. 4 is a wiring diagram of a high pass filter.

Filter in Fig. 4—$g_b = \dfrac{jn}{1+jn}$

Figure 5:
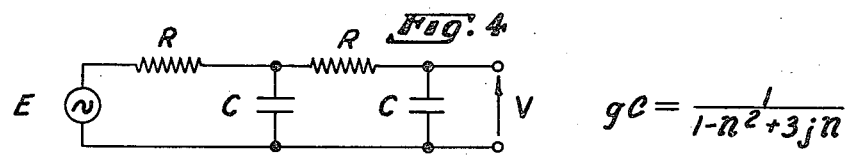
Fig. 5 is a wiring diagram of a two-section low pass filter.

Filter in Fig. 5—$g_c = \dfrac{1}{1-n^2+3jn}$

Figure 6:
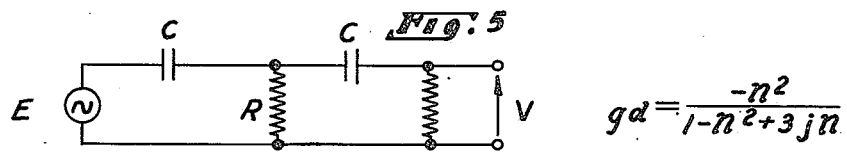
Fig. 6 is a wiring diagram of a two section high pass filter.

Filter in Fig. 6—$g_d = \dfrac{-n^2}{1-n^2+3jn}$

Figure 7:
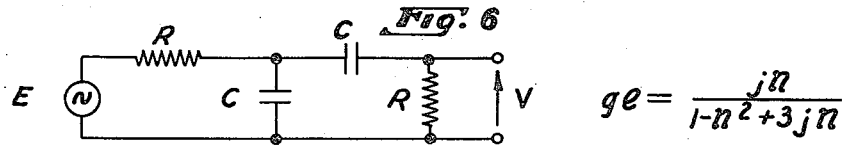
Fig. 7 is a wiring diagram of a band pass filter.

Filter in Fig. 7—$g_e = \dfrac{jn}{1-n^2+3jn}$ where $g_a$, $g_b$, $g_c$, $g_d$, and $g_e$ are the respective transfer functions, $j$ is the factor $\sqrt{-1}$, and $n$ is equal to $\omega RC$. R is the resistance in the respective filters, C is the capacitance, and $\omega$ is equal to $2\pi f$ where $f$ is the input frequency of the particular component under consideration. RC is the time constant of one filter section. For example, if E is the input voltage to the filter of Figure 3 the output voltage V is:

$$V = g_a E \tag{1}$$

Figure 8:
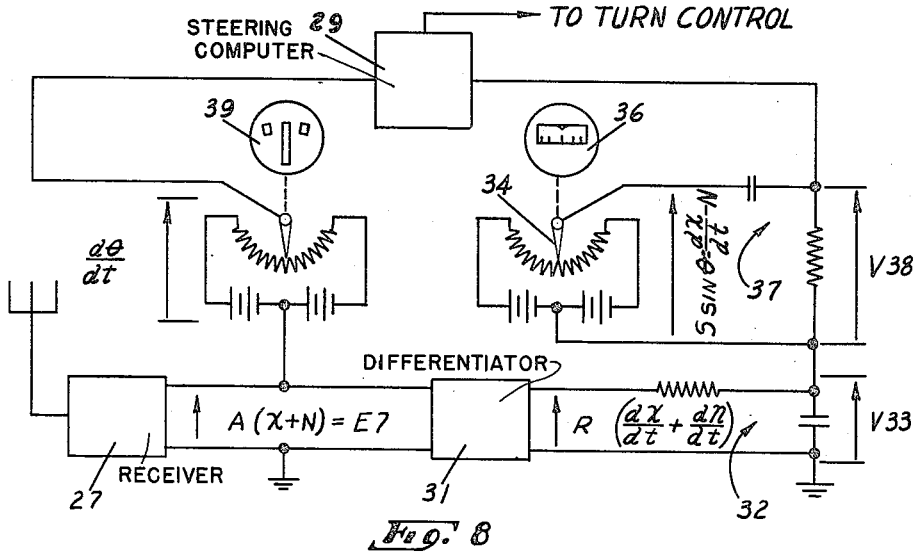
Fig. 8 is a schematic diagram of an aircraft control system which obtains the transverse velocity signal of the aircraft from radio receiving apparatus and a heading indicating device.

It is therefore seen that to obtain the output voltage of any filter only the input voltage and the transfer function need be known. The way in which one object of this invention is achieved is shown in Figure 8. Here the desired signal $Ax$ from receiver 27 is applied to a perfect differentiating circuit 31 which produces an output signal proportional to $$\frac{dx}{dt}$$

In complex form, $$\frac{dx}{dt}$$

is written $j\omega x$. The output of differentiator 31 is applied to a low pass filter 32, and the output 33 obtained is:

$$V_{33} = j\omega x g_a = \frac{j\omega x}{1+jn} \tag{2}$$

A pickoff 34 on gyro compass 36 obtains a voltage proportional to $S \sin \theta$, where S is the true air speed which is assumed known and constant and $\theta$ is the heading departure angle from the beam heading as shown in Figure 1. The lateral velocity is:

$$\frac{dx}{dt} = S \sin \theta + W \tag{3}$$

where W is the cross-wind component of the wind velocity. Hence $$S \sin \theta = \frac{dx}{dt} - W \tag{4}$$

When the desired component of $S \sin \theta$, namely $$\frac{dx}{dt} = j\omega x$$

is applied to high pass filter 37, the desired output 38 is:

$$V_{38} = g_b \frac{dx}{dt} - \frac{n\omega x}{1+jn} \tag{5}$$

The outputs of filters 32 and 37 are added to obtain:

$$V_{33} + V_{38} = \frac{j\omega x - \omega^2 RC x}{1+jn} = \frac{j\omega X(1+jn)}{1+jn} = \frac{dx}{dt} \tag{6}$$

Hence the required reference signal $$\frac{dx}{dt}$$

is obtained from the combined outputs of filters 32 and 37 and fed to a steering computer 29 along with a signal proportional to $$\frac{d^2x}{dt}$$

obtained from rate-of-turn gyro 39 and a signal proportional to $x$ obtained directly from receiver 27. However, the signal applied to filter 37 contains undesired low frequency components due to changing cross winds and the signal applied to filter 32 contains undesired high frequency components due to beam fluctuations. These components are present in the outputs of $V_{32}$ and $V_{38}$ but the high frequency components are attenuated in low pass filter 32 and the low frequency components are attenuated in high pass filter 37. The first term of Equation 6, which is derived from the radio signal, may be written $$\frac{j\omega x}{1+j\omega RC}$$

and the second term, which is derived from the compass signal, may be written $$j\omega x \left( \frac{j\omega RC}{1+j\omega RC} \right)$$

This shows that at very high frequencies practically all of the signal is derived from the compass 36 and at very low frequencies practically all of it comes from the radio. Thus, means have been provided for obtaining a transverse velocity signal which is much more accurate than when it is obtained from the radio signal alone.

Figure 9:
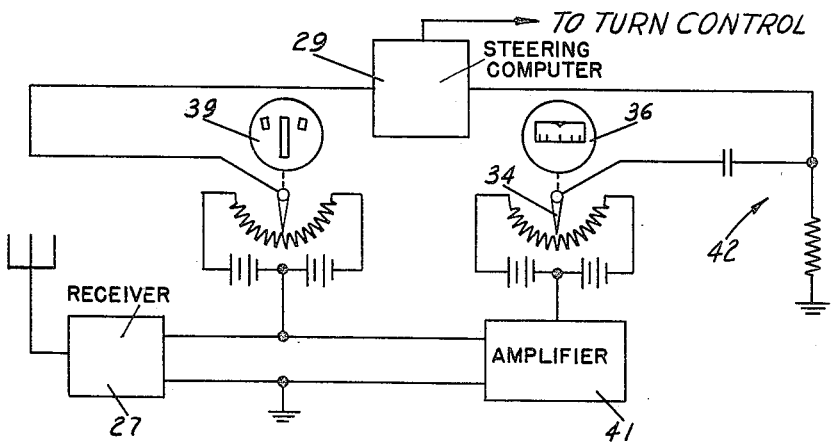
Fig. 9 is a schematic diagram of a modification of the system shown in Fig. 8.

The same object can be achieved in the circuit shown in Fig. 9. Here the differentiator 31 of Fig. 8 has been eliminated and a signal proportional to $x$ from the receiver is applied to an amplifier 41 which has a gain equal to $$\frac{1}{RC}$$

The output of the amplifier is combined with the signal from the pickoff 34 and fed to the high pass filter 42.

The output signal is:

$$V_{42} = g_b \left( \frac{x}{RC} + j\omega x \right) \tag{7}$$

or $$V_{42} = \frac{j\omega RC x \left( \frac{x}{RC} + j\omega x \right)}{1+j\omega RC} = \frac{j\omega x(1+jn)}{1+jn} = \frac{dx}{dt} \tag{8}$$

This is exactly the same as (6).

Figure 10:
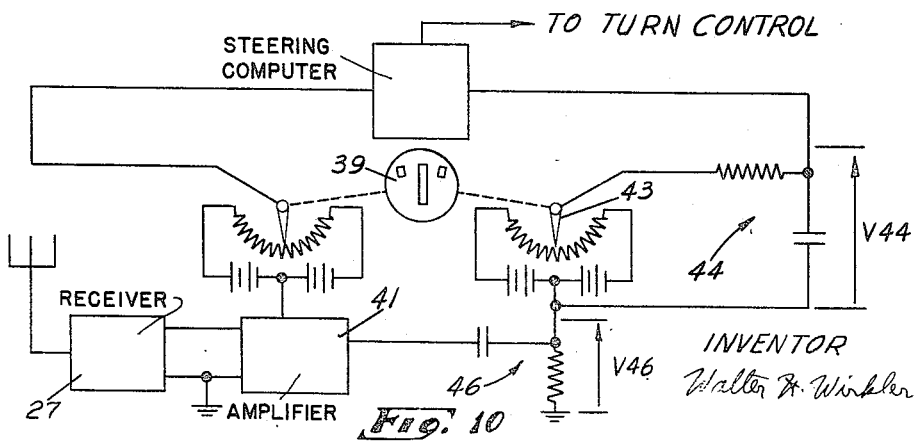
Fig. 10 is a schematic diagram of an aircraft control system wherein the transverse velocity is obtained by combining signals from radio receiving apparatus and the rate of turn gyro.

Similar results can be achieved by means of the circuit of Fig. 10 where the compass signal is replaced by a signal from a pickoff 43 on the rate-of-turn gyro 39, at least for the final part of the flight path where the heading departure angle $\theta$ is small so that $$\frac{d\theta}{dt}$$

is a rather accurate measure of $$\frac{d^2x}{dt^2}$$

This signal is applied to the low pass filter 44 and the output is added to the output of high pass filter 46 to which is applied a radio signal from the amplifier 41. In complex form, $$\frac{d^2x}{dt^2}$$

is written $-\omega^2 x$ and if the pickoff 43 contains a proportionality factor of RC, the signal applied to filter 44 is proportional to $-\omega^2 x RC$ and the signal applied to filter 46 is proportional to $$\frac{x}{RC}$$

so that:

$$V_{46} + V_{44} = \frac{x g_b}{RC} - \omega^2 x RC g_a \tag{9}$$

or $$V_{46} + V_{44} = \frac{-\omega^2 RC X + j\omega x}{1+j\omega RC} = j\omega x \left( \frac{1+j\omega RC}{1+j\omega RC} \right) = \frac{dx}{dt} \tag{10}$$

Again, it is seen from Equation 10 that the first term, which is derived from the radio signal, contains the low frequency components of $$\frac{dx}{dt}$$

and the second term, which is derived from the rate-of-turn signal, contains the high frequency components; the combination of the two filtered signals is mathematically identical with $$\frac{dx}{dt}$$

However, the signal from the rate-of-turn gyro is not a true measure of $$\frac{d^2x}{dt^2}$$

if there is a changing cross wind, a slip, or a skid. Because only the high frequency components of $$\frac{dx}{dt}$$

are derived from the rate gyro, the low frequency components due to cross wind are effectively attenuated in this arrangement, as are the high frequency perturbations from the radio signal.

In the reference signals $x$ and $$\frac{d^2x}{dt^2}$$

fed to computer 28, however, neither of these components are suppressed. This can be remedied in part by filtering arrangements to be described later in which the low frequency components of $$\frac{d^2x}{dt^2}$$

are derived from the radio signal and the high frequency components of $x$ from the acceleration signal, somewhat as done in Figure 10 for $$\frac{dx}{dt}$$

In any of these filtering systems, the time constant RC determines how much of the frequency band is derived from radio signals and how much from acceleration signals. If the acceleration signals contain considerable perturbing components at relatively high frequencies, RC must be relatively small so that most of the information is derived from the radio, otherwise the perturbances in the acceleration signals are not attenuated sufficiently. This then requires a radio signal of higher quality.

It would be desirable, therefore, if the acceleration signals could be obtained from an accurate linear accelerometer, gyro stabilized about all three axes, which would measure the lateral acceleration directly. This would eliminate errors in the acceleration signal due to cross wind, and would measure acceleration correctly whether caused by bank angle or by skid. Consequently, RC could be relatively larger and the perturbing components from the radio signal could be attenuated more effectively, permitting satisfactory operating from a beam of relatively poorer quality or obtaining even more precise control from a good-quality beam.

Figures 11, 12:
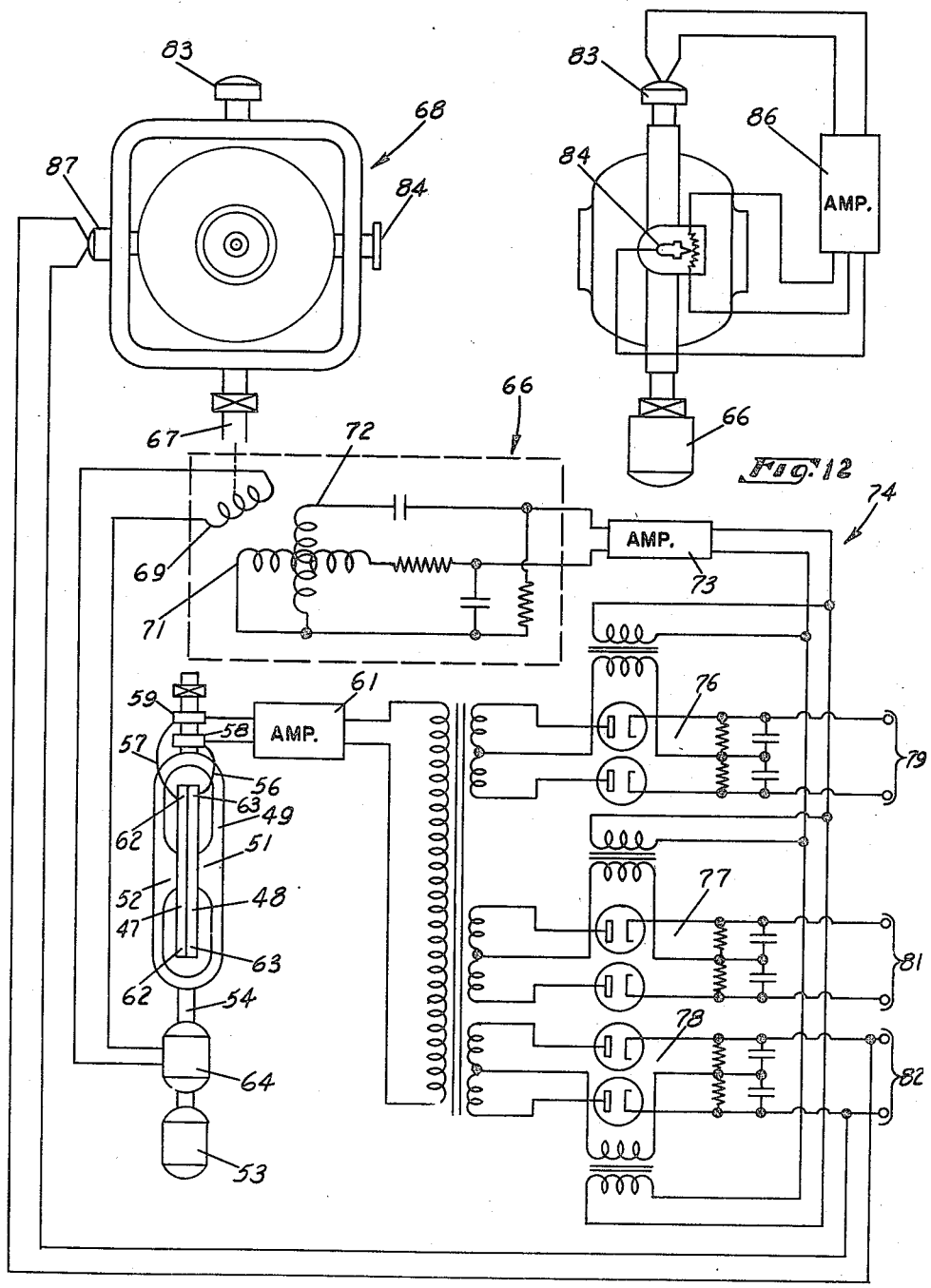
Fig. 11 is a composite view showing an accelerometer and the related circuitry required to obtain a desired acceleration.
Fig. 12 is a side elevational view of the gyro vertical shown in Fig. 11.

One form of lateral accelerometer which is in effect stabilized about the roll axis only is shown in Figure 11. A pair of piezoelectric elements 47 and 48 are mounted within a hollow frame member 49. Holding portions 51 and 52 maintain the elements 47 and 48 in a fixed spatial relationship with the inner surface of the frame member 49. The frame member 49 is rotated by motor 53 so that it spins about an axis 54 parallel to and preferably coincident with the longitudinal axis of the aircraft. The piezoelectric elements deliver an electrical signal proportional to the accelerating forces perpendicular to the axis of spin. This signal is picked up by the conductors 56 and 57 and furnished by means of slip rings 58 and 59 to amplifier 61. A unidirectional acceleration of the aircraft perpendicular to the axis of spin will result in an alternating electrical signal of spin frequency because of the flexing of ends 62 and 63 of the crystals 47 and 48. An A.-C. single phase generator 64 is also driven by motor 53 at the same frequency as the frame member 49. The time phase of the alternating electrical output of the crystals 47 and 48 with respect to that of generator 64 is determined by the angle between the direction of the acceleration and a plane through the axis of spin. The output of generator 64 is passed through the phase shifter designated generally as 66, which is actuated by shaft 67 which is rigidly attached to the roll axis of the gyro vertical 68. The phase shifter 66 consists of a rotary transformer primary 69 driven by shaft 67 and energized by the output of generator 64 and two stationary secondary windings 71 and 72 in quadrature space relation connected through an amplifier 73, to the phase detector network, designated generally as 74. Thus the outputs of the two secondary windings are shifted ninety electrical degrees with respect to each other before being combined in the input to amplifier 73. Hence the phase shifter 66 varies the phase of the output of amplifier 73 in accordance with the bank angle of the aircraft so that the phase of its output with respect to the output of amplifier 61 is determined by the angle between the acceleration of the aircraft and a true vertical plane through the axis of spin and parallel to the longitudinal axis of the aircraft.

The signals from amplifiers 61 and 73 are combined in directional rectifier or phase detector circuits 76, 77, and 78, the direct current outputs of which are available at terminals 79, 81, and 82 respectively for insertion into different parts of the circuits here described. The three circuits are identical and are well known to those skilled in the art. The initial adjustment of the angular shaft position of generator 64 with respect to the frame member 49 is such that the outputs of the phase detector circuits 76, 77, and 78 are zero when the acceleration is in a vertical plane, such as is the case for the acceleration of gravity. The voltages across terminals 79, 81, and 82 are thus proportional to the horizontal component of acceleration perpendicular to the longitudinal axis of the aircraft. If the angle of departure, $\theta$, between aircraft and beam heading is relatively small, the acceleration measured corresponds rather closely to the actual lateral acceleration of the aircraft, perpendicular to the beam. Since the acceleration signals must be most accurate during the final phase of the landing approach when $\theta$ is small, it is not essential that the entire system of Figure 11 be gyro stabilized about all three axes as would be required for accurate acceleration signals under all possible attitude conditions.

The accelerometer element of Figure 11 preferably should be mounted nearest that portion of the aircraft the position of which is to be controlled most accurately. Preferably, the accelerometer and the beam-sensing radio antenna should both be mounted above the main wheels of the landing gear since not all parts of the aircraft have the same acceleration or lateral displacement from the beam when yawing movements are present.

The gyro vertical 68 of Figure 11 may be of conventional construction. Torque motor 83, visible in the top view of Figure 11 and in the side view of Figure 12, erects the gyro about the pitch axis and may be controlled by pitch pendulum pickoff 84 acting through amplifier 86. Torque motor 87 which erects the gyro about the roll axis may be operated directly from, say, terminals 82, since a continuous voltage from 82 is a good indication of error in roll-axis erection. Alternatively, the signal from terminals 82 might operate a servo motor which rotates the frame of rotary transformer 66 very slowly so as to remove the fixed error of the accelerometer, the gyro being erected about both axes by means of pendulum signals. The error components of extremely low frequency due to the erection of the gyro and the operation of the error-correcting motor are not important since it is not intended to derive the very low frequency components of $x$, $$\frac{dx}{dt}$$

or $$\frac{d^2x}{dt^2}$$

from the accelerometer signal.

Figure 13:
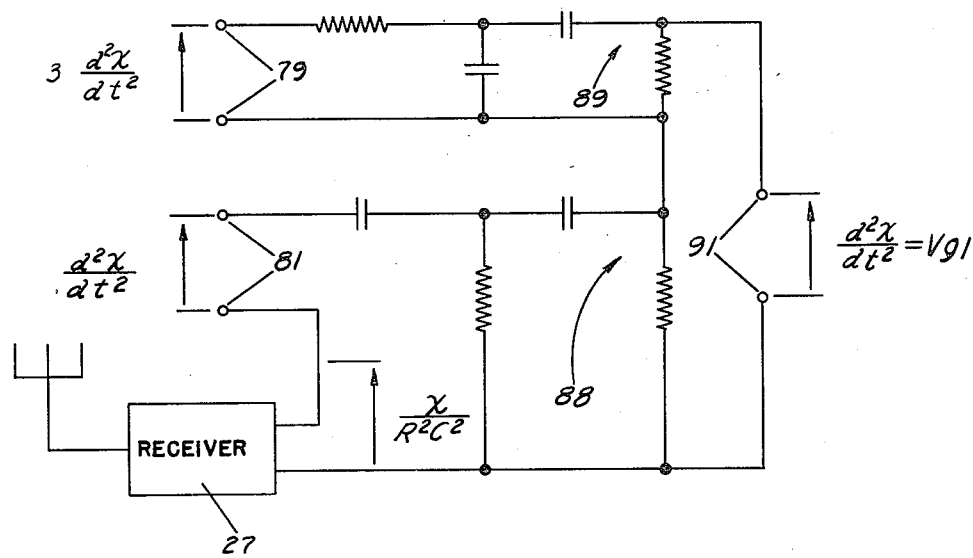
Fig. 13 is a schematic diagram illustrating a system for obtaining the transverse acceleration of an aircraft from radio receiving apparatus and the accelerometer shown in Fig. 11.

A system for obtaining the higher frequency components of $$\frac{d^2x}{dt^2}$$

from the accelerometer signal and the lower frequency components from the radio beam displacement signal is shown in Figure 13. Here a signal proportional to $$\frac{x}{R^2C^2}$$

is obtained from radio equipment 27 and applied in series with a signal proportional to $$\frac{d^2x}{dt^2}$$

from terminals 81 of the accelerometer shown in Figure 11 to the input of a two section high pass filter 88 of the type shown in Figure 6. The output voltage of filter 88 is added to the output of a band pass filter 89 of the type shown in Figure 7, to the input of which is applied a voltage proportional to $$3\frac{d^2x}{dt^2}$$

from an amplifier, not shown, which receives a signal from terminals 79 of the accelerometer shown in Fig. 11. It is to be noted that the acceleration signal received by filter 89 is three times the signal received by filter 88. The combined output for the two filters 88 and 89 is given by:

$$V_{91}=\left(\frac{x}{R^2C^2}-\omega^2 x\right)g_d-3\omega^2 x g_a \quad (11)$$

or $$V_{91}=\frac{\omega^2 x+\omega^2 x n^2-3j\omega^2 x n}{1-n^2+3jn}=-\omega^2 x=\frac{d^2x}{dt^2} \quad (12)$$

The first term of Equation 12 is derived from the radio signal and the second two terms from the accelerometer signal. The unidirectional and very low frequency error components from the accelerometer signal are thus effectively blocked out, and the higher frequency noise perturbations from the radio signal are attenuated at the rate of 12 db per octave for the higher frequencies at which the first two terms of 12 can be neglected. The output signal appearing at terminals 91 is nevertheless a true acceleration signal containing all of the desired frequency components in $$\frac{d^2x}{dt^2}$$

in the proper phase and amplitude.

Figure 14:
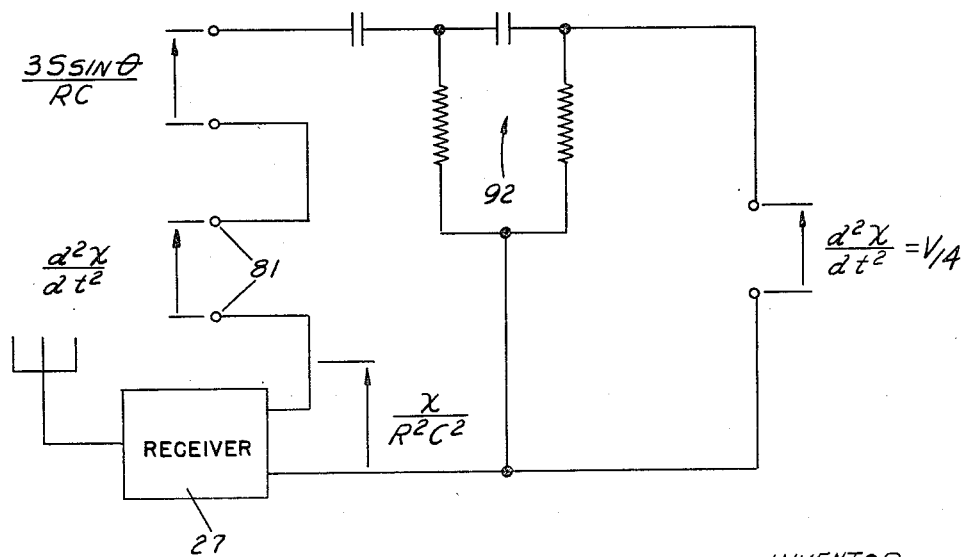
Fig. 14 is a modification of Fig. 13 in which the acceleration is obtained by combining signals from the radio receiving equipment, an accelerometer and compass instrument.

An alternative arrangement for obtaining the acceleration signal is shown in Figure 14. Here the signal from radio equipment 27 and a signal from terminals 81 of the accelerometer are obtained in the same way as in Fig. 13, but the middle term is obtained from a compass signal proportional to $$\frac{3S \sin \theta}{RC}$$

and this signal is passed through a two section high pass filter 92 of the type shown in Fig. 6 along with the other two signals. In the absence of cross winds, $$S \sin \theta = \frac{dx}{dt}$$

where S is the known true air speed. Hence the output of this filter is given by $$V_{14}=\left(\frac{x}{R^2C^2}-\omega^2 x+\frac{3j\omega x}{RC}\right)g_d=$$

$$\frac{-\omega^2 x+\omega^2 x n^2-3j\omega^2 x n}{1-n^2+3jn}=\frac{d^2x}{dt^2} \quad (13)$$

Here only the highest frequency components of the desired acceleration signal are obtained from the accelerometer. The lowest frequency components are obtained from the radio signal, and the mid-frequency components from the compass signal. The unidirectional error in the compass signal due to a steady cross wind is blocked out, and the low frequency components due to a changing cross wind are attenuated considerably by the two section filter. The reason the high frequency perturbing components from the radio signal are attenuated over the value they would take were the total acceleration signal obtained from the radio signal is not obvious from inspection of the filter circuit but resides in the fact that the amplitude of the radio signal applied to the filter is inversely proportional to the square of the time constant RC. The larger this time constant, the smaller is the total fraction of the acceleration signal which must be derived from the radio signal.

Five methods for obtaining the transverse velocity signal $$\frac{dx}{dt}$$

are shown in Figures 15, 16, 17, 18, and 19. These are improvements over the arrangements of Figures 8, 9, and 10 in that they permit the high frequency components of noise in the rate of change of radio signal to be attenuated at the rate of 12 db per octave rather than only 6 db per octave.

Figure 15:
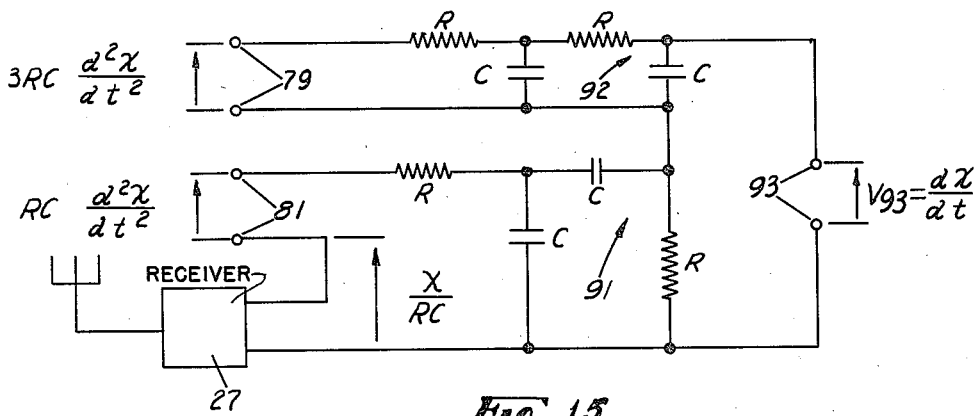
Fig. 15 is a schematic diagram illustrating a system for obtaining the transverse velocity of an aircraft by combining signals from radio receiving means and an accelerometer.

In Figure 15 a signal proportional to $$\frac{x}{RC}$$

obtained from radio equipment 27 along with a signal 81 proportional to $$RC\frac{d^2x}{dt^2}$$

obtained from the accelerometer shown in Fig. 11 is applied to the input of a band pass filter 91. The output of filter 91 is added to the output of a two section low pass filter 92 to the input of which is applied another accelerometer signal 79 proportional to $$3RC\frac{d^2x}{dt^2}$$

The combined filter output 93 is then $$V_{93}=\frac{x}{RC}g_e-3\omega^2RCxg_e-\omega^2RCxg_e=$$

$$\frac{j\omega x(1+3jn-n^2)}{1-n^2+3jn}=\frac{dx}{dt} \quad (14)$$

In Equation 14 the first term containing the low frequency components is derived from the radio signal and the other two terms containing the mid-frequency and high frequency components are derived from the accelerometer signal. Although the error components from the accelerometer in the low frequency band are attenuated, the error spectrum contains a discontinuity at zero frequency, representing a unidirectional error. This error is much less than if the total velocity signal had been obtained by integrating the accelerometer signal, but is not blocked out by filter 92 of Figure 15 and is the result of obtaining the mid-frequency components from the accelerometer signal. If this unidirectional error were caused by the roll axis gyro of Figure 12 being out of plumb, for example by one degree, an acceleration error equal to the acceleration of gravity multiplied by the sine of one degree would result. This amounts to $$\frac{32.2}{57.3}=0.562 \text{ ft./sec.}^2$$

if the filter time constant were 4.0 seconds, for example, the input and output of filter 92, Figure 15, would contain an error component equal to 3RC seconds multiplied by 0.562 ft./sec.², or 12×0.562=6.74 feet per second, corresponding to a velocity error of 4.54 miles per hour. The operation of the gyro erection system or of the servo-driven error corrector applied to phase shifter 66, Figure 11, can eventually reduce this error to zero. It must be recognized, however, that this is equivalent to passing the accelerometer signal through a high pass filter of the type shown in Fig. 4 of time constant determined by the correction rate. It is necessary that this filter pass faithfully without excessive phase shift all frequency components of importance in the second term of Equation 14. Only at frequencies so low that the second term of Equation 14 is essentially negligible with respect to the first term is it permissible for the equivalent filter of Figure 4 to attenuate the accelerometer signal. This means that the erection or servo correction rate must be correspondingly low; an erection time constant of the order of two minutes being satisfactory in this case.

Figure 16:
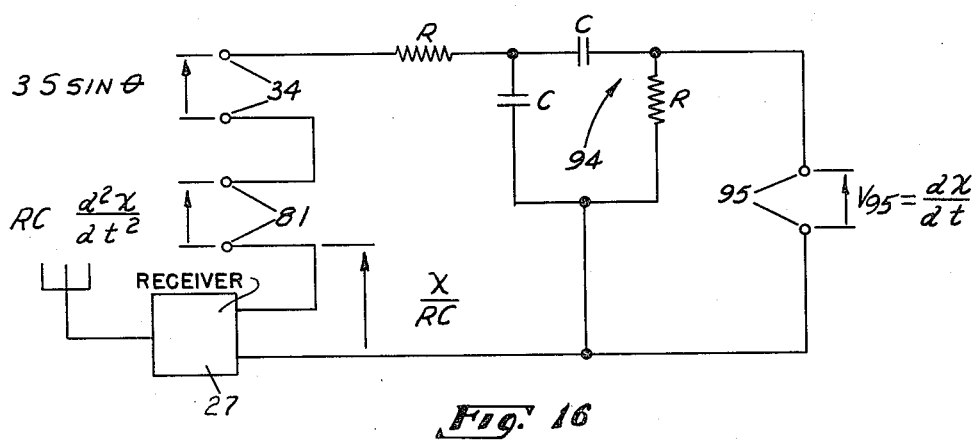
Fig. 16 is a schematic diagram illustrating a system for obtaining transverse velocity by combining signals from radio receiving means, compass instruments, and an accelerometer.

In the arrangement shown in Figure 16 the low and high frequency components of $$\frac{dx}{dt}$$

are obtained as in Figure 15 but the mid-frequency components are obtained by passing a signal $3S \sin \theta$ from the compass pickoff 34 through band pass filter 94 along with the other two signals. The output 95 for filter 94 is given by:

$$V_{95}=\left(\frac{x}{RC}+3j\omega x-\omega^2 RCx\right)g_e=\frac{j\omega x(1+3jn-n^2)}{1-n^2+3jn}=\frac{dx}{dt}$$

(15)

In this arrangement the unidirectional accelerometer error is blocked out and the high frequency radio beam perturbations are attenuated. The unidirectional error in the compass signal due to cross wind is blocked out and both the lowest frequency errors due to changing cross wind and the highest frequency errors due to skids or slips are attenuated.

Figure 17:
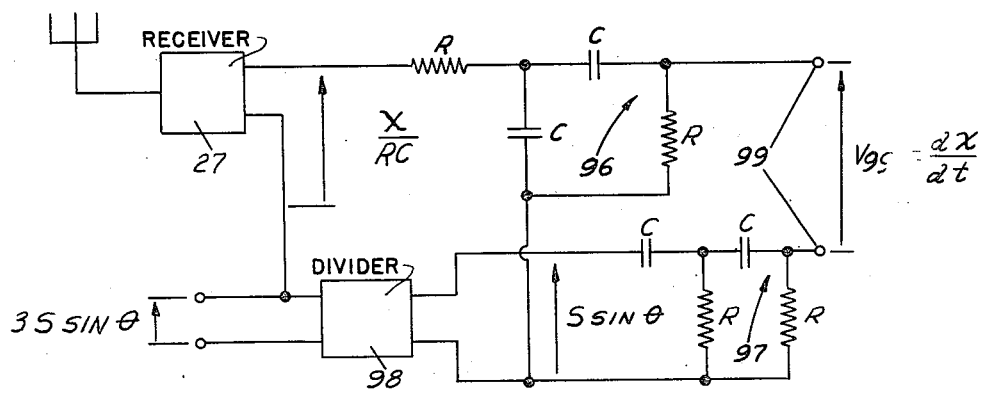
Fig. 17 is a schematic diagram illustrating a system for obtaining the transverse velocity of an aircraft by combining signals from radio receiving and compass instruments.

In the arrangement shown in Figure 17 the low frequency components of $$\frac{dx}{dt}$$

are obtained from the radio signal as in Figs. 15 and 16 and both the midfrequency and the high components are obtained from the compass signal. A compass signal proportional to $3S \sin \theta$ is applied to band pass filter 96 along with a radio signal proportional to $$\frac{x}{RC}$$

The output of filter 96 is added to the output of two section high pass filter 97 to the input of which is applied a signal proportional to $S \sin \theta$ obtained from the compass and by passing it through the dividing mechanism 98. The combined output 99 of the two filters is then given by:

$$V_{99}=\left(\frac{X}{RC}+3j\omega\omega\right)g_e+j\omega xg_d=\frac{j\omega x(1+3jn-n^2)}{1-n^2+3jn}=\frac{dx}{dt}$$

(16)

This arrangement is just as effective in attenuating high frequency beam perturbances as are those of either Figure 15 or 16 and does not require an accelerometer, but the high frequency errors due to skids and slips are not suppressed.

Figure 18:
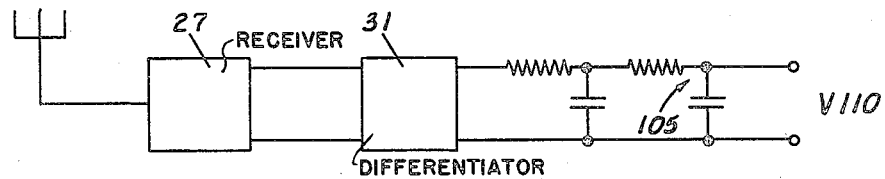
Fig. 18 is a schematic diagram illustrating the system pertaining to the velocity of an aircraft perpendicular to a beam by using a radio receiver differentiating means and suitable filter.
Figure 19:
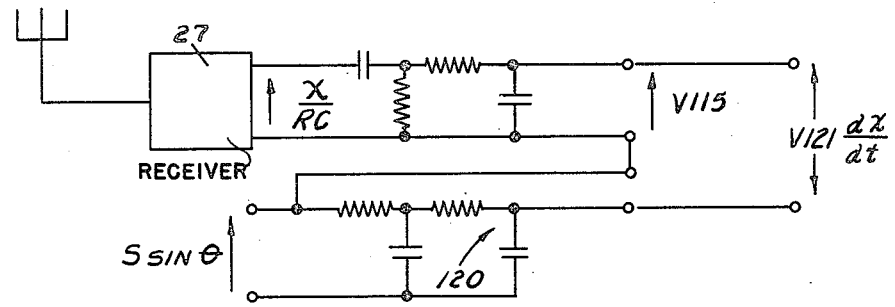
Fig. 19 is a schematic diagram illustrating the system pertaining to the velocity of an aircraft perpendicular to a beam by utilizing radio receiving apparatus and a signal from a heading indicating instrument.

The general method by which filter combinations can be synthesized to produce the result desired is illustrated in connection with the system in Fig. 18. It is desired to obtain the low frequency components of $$\frac{dx}{dt}$$

from the radio signal as though from a perfect differentiator 31 followed by a two section low pass filter 105 in Fig. 18. It is recognized immediately that the transfer function of differentiator 31 followed by a single low pass filter is equivalent to that of a single high pass section. Hence the treatment of the radio signal in Fig. 19 is the same as in Fig. 18, and the output at terminals 110 and 115 are equal. The purpose of the compass signal $S \sin \theta$, which is dimensionally equivalent to $$\frac{dx}{dt}$$

is to supply the components of the derived signal $$\frac{dx}{dt}$$

that are missing in the filtered radio rate signal of Fig. 18. This could be done by feeding the full compass signal to the combined output terminals 115 and then subtracting a compass signal which has passed through a two-section low-pass filter 120. That is, those components of $$\frac{dx}{dt}$$

which have already been supplied by the radio signal are cancelled out from the compass signal to obtain $$V_{121} = \frac{X}{RC} g_c + j\omega X(1-g_c) \quad (17)$$

However, $$1 - g_c = \frac{-n^2 + 3jn}{1 - n^2 + 3jn} = g_d + 3g_e \quad (18)$$

so that $$V_{121} = \left(\frac{X}{RC} + 3j\omega X\right) g_e + j\omega X g_d = V_{99} \quad (19)$$

That is, the system of Fig. 19 is mathematically identical with that of Fig. 17 for the particular basic structure chosen for the prototype filter of Fig. 18. There is no particular limitation as to the nature of this prototype, however, so that a large number of variations in the derived structure are possible.

Figure 20:
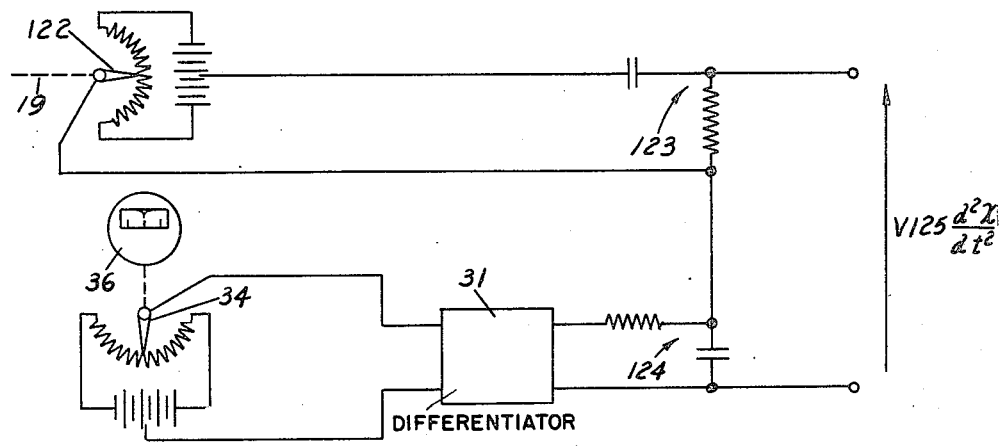
Fig. 20 is a schematic diagram illustrating a system for obtaining acceleration of an aircraft perpendicular to a beam.
Figure 21:
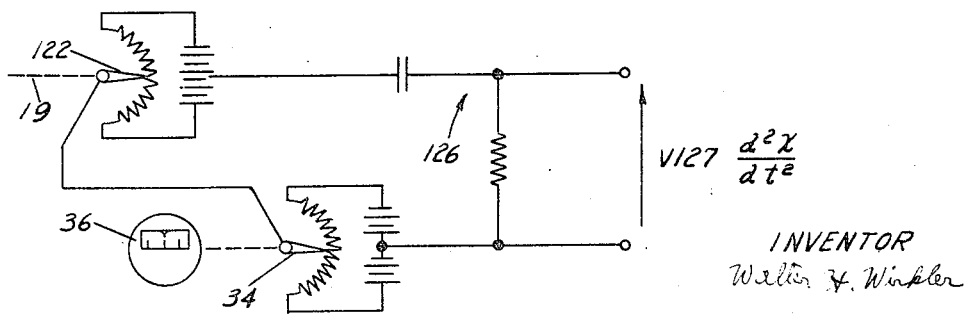
Fig. 21 is a schematic diagram illustrating a system for obtaining the acceleration of an aircraft perpendicular to a beam from a vertical gyro and heading indicating instrument.

Another useful application of the principles of this invention is the method for obtaining a signal proportional to the transverse acceleration of the aircraft as shown in Figs. 20 and 21. It is known that a signal can be obtained from an appropriate pick-off on a roll-axis gyro which is dimensionally equivalent to acceleration, but that this signal may have unidirectional and low frequency error components from listing of the aircraft due to improper trim. Similarly, the differentiated compass signal is dimensionally equivalent to acceleration but may have high frequency error components due to poor coordination when starting or stopping a turn. According to the teachings of this invention, and referring to Fig. 20, a superior acceleration signal can be obtained by feeding the signal from pickoff 122 on roll axis 19 of the gyro vertical through a high-pass filter 123 and combining the output of this filter with the differentiated compass signal fed through a low pass filter 124. It is recognized at once that the results $V_{125}$ is the same as feeding the compass and bank angle signals both through a high pass filter 126 as in Fig. 21. Although the choice of time constant in this filter is arbitrary, an important additional benefit is gained if the time constant is made equal to that determined by the mass and lateral profile drag coefficient of the airplane. In this case, if a small course correction is made by rudder control alone with the wings maintained level, the lateral acceleration due to skidding is momentarily proportional to the incremental yaw angle but falls off exponentially as lateral velocity is gained. Since the bank angle signal is zero during this maneuver, the time constant of filter 126 in Fig. 21 can be chosen so that the voltage $V_{127}$ at its output terminals in response to a changing compass signal synthesizes the acceleration of the aircraft by analogy. It is true that this acceleration signal is accurate only for a particular aircraft loading and airspeed and is in error during a change of wind velocity so that the accelerometer of Fig. 11 is still a preferred source of acceleration signal. Nevertheless, the output voltage of Fig. 21 is an acceleration signal superior to that of a bank angle or rate of turn gyro alone. In the absence of an accelerometer, it is recommended that this voltage be utilized, through suitable amplifier circuits, not only as a source of acceleration reference signal for steering computer 29 but for insertion at terminals 26 and 27 in Figs. 15, 16, and 22 for deriving superior displacement and velocity reference signals.

Figure 22:
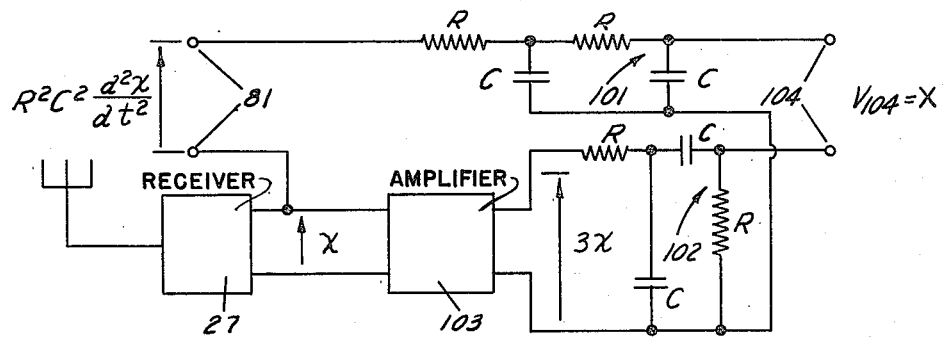
Fig. 22 is a schematic diagram illustrating a system for obtaining the deviation of an aircraft from the beam by combining signals from radio receiving means and an accelerometer.
Figure 23:
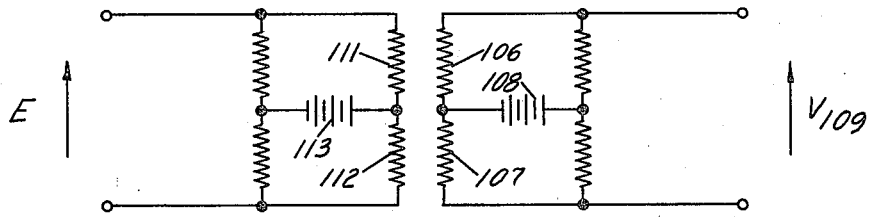
Fig. 23 is a wiring diagram of a temperature sensitive lag device which operates analogous to the low pass filter shown in Fig. 4.
Figure 24:
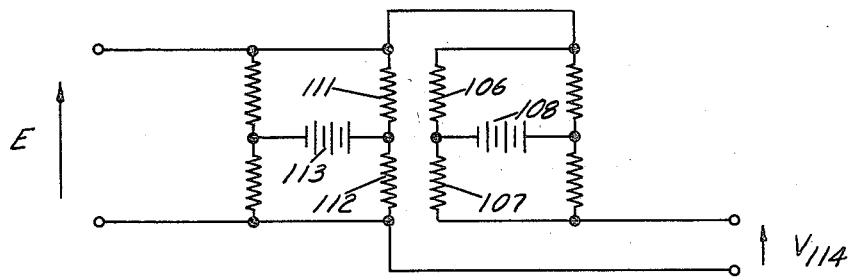
Fig. 24 illustrates a modification of the device shown in Fig. 19 to obtain a lead device analogous to the high pass filter shown in Fig. 5.

Even the lateral displacement signal $x$ need not be obtained entirely from the radio signal if a reliable accelerometer signal is available. In the arrangement of Figure 22, for example, a radio signal proportional to $x$ from radio equipment 27 is applied to the input of a two section low pass filter 101 along with an accelerometer signal from terminals 81 proportional to $$(RC)^2 \frac{d^2x}{dt^2}$$

The output of filter 101 is added to that of a band pass filter 102 to the input of which is applied a signal from the radio proportional to $3x$. An amplifier 103 with a gain of 3 furnishes this signal from the radio equipment 27. The combined output voltage 104 from the two filters is:

$$V_{104} = xg_c + 3xg_e - \omega^2 R^2 C^2 xg_c = \frac{x(1+3jn-n^2)}{1-n^2+3jn} = x \quad (20)$$

The low frequency and mid-frequency components contained in the first two terms of Equation 17 are thus obtained from the radio signal and only the high frequency components in the third term are obtained from the accelerometer signal. The unidirectional accelerometer error is not blocked out by filter 101, and an automatic gyro erecting or servo correcting system must be used to remove this error. If the accelerometer signal is to be used only in the arrangements of Figure 13 or 14 and Figure 16 and Figure 22, the time constant of the correcting system may be relatively short, however, since it is required only that the correcting system pass undisturbed frequency components so low that the third term of Equation 17 becomes comparable to the second term in magnitude. A correction or erection time constant in the order of 5 to 10 seconds would be suitable in this case where $RC=4$ seconds. If the bank axis gyro remains one degree out of plumb so that an acceleration error of 0.562 ft./sec.$^2$ remains and is present at terminals 81, Figure 18, the resulting beam displacement error is 0.562 $R^2C^2$ or $0.562 \times 16 = 9$ feet.

All of the filter circuits shown in Figures 3–7 and used to illustrate the principles of this invention contain condensers of the same capacitance C and resistors of the same resistance R. In the case of the two section filters of Figures 5, 6, and 7, somewhat similar results could be obtained if the resistance of the output section were many times that of the input section so that the loading of the first section by the input impedance of the second section could be neglected, provided that the time constant $R_2C_2$ of the second section is the same as that of the first section, $R_1C_1$. In this case, the equations for deriving $x$, $$\frac{dx}{dt} \text{ and } \frac{d^2x}{dt^2}$$

from the various signals are like those here given except that the coefficient of the mid-frequency term in each equation and the coefficient of the $jn$ term in the denominator of each equation is 2.0 instead of 3.0. The same result is obtained if an isolating device such as a vacuum tube amplifier is employed between filter sections.

Figure 26 illustrates a steering system for an aircraft following a localizer beam embodying the principles of this invention in several of its component circuits. Here the D.-C. output of localizer receiver 27 is converted to 400 cycle per second alternating current by modulator 128 which may be a magnetic modulator of the type conventionally used for this purpose, excited from the main 400 C. P. S. A.-C. power supply of the airplane. In the circuit of Fig. 26 the functions of adding, amplifying and limiting the various signals are effected in A.-C. circuits, and the various filtering functions are effected in D.-C. circuits. Conversion from D.-C. to A.-C. is accomplished in modulators 129, 131 and 132, a typical form of which is shown in Fig. 27, comprising a balanced cathode follower stage operating from a high impedance filter circuit and actuating a ring modulator 133 which is excited from the 400 C. P. S. line as shown. Conversion from A.-C. to D.-C. is accomplished in phase detector or polarized rectifier circuits 134, 136, 137, and 138, a typical form of which is shown in Fig. 28 and comprises a pair of diode rectifiers 139 and 141 in the conventional balanced rectifier arrangement shown, with polarizing power also drawn from the 400 C. P. S. line. Amplifier circuits 142, 143, 144 and 146 which combine several signals in their A.-C. input circuits are typified by the conventional mixing amplifier of Fig. 29. Limiting devices 147 and 148 may comprise nothing more than conventional A.-C. amplifiers which overload so that the output does not exceed a specific fixed value no matter how strong the input signal.

The reference signal $$\frac{d^2x}{dt^2}$$

in the output of modulator 131 is derived by combining a signal from compass pickoff 34 and a signal from bank angle gyro pickoff 149 in amplifier 143, converting to D.-C. in rectifier 136, and passing this D.-C. signal through high-pass filter 151 to converter 131. The gain controls of amplifier 143 are so proportioned that the inputs to high pass filter 151 from compass pickoff 34 and bank angle pickoff 149 are proportional to $-\omega^2 x$ and $$\frac{j\omega x}{R_{151}C_{151}}$$

respectively, so that the output of modulator 131 is:

$$V_{151}=\left(-\omega^2 x+\frac{j\omega x}{R_{151}C_{151}}\right)g_b=-\omega^2 x=\frac{d^2x}{dt^2} \quad (21)$$

$R_{151}C_{151}$ is in this case made equal to the lateral control or skid time constant of the airplane.

The reference signal $$\frac{dx}{dt}$$

is obtained from the output of band-pass filter 152 through modulator 129 according to the principles of this invention as illustrated in Fig. 16. The input of filter 152 must contain components respectively proportional to $$\frac{X}{RC}, \quad R_{152}C_{152}\frac{d^2x}{dt^2} \quad \text{and} \quad 3\frac{dx}{dt}$$

These components are supplied through amplifier 142 and rectifier 134 from leads 153, 154 and 156. The component $$\frac{X}{RC}$$

is obtained directly from the A.-C. radio signal in the output of modulator 128. The components $$R_{152}C_{152}\frac{d^2x}{dt^2} \quad \text{and} \quad d\frac{dx}{dt}$$

are obtained by a proper combination of signals from lead 154 supplied with a signal proportional to the output voltage of filter 151 and lead 156 supplied with a signal proportional to the input voltage of filter 151. For the proper proportioning of these two signals, the signal obtained from lead 154 is made proportional to:

$$V_{154}=(R_{152}C_{152}-3R_{151}C_{151})V_{136}g_b \quad (22)$$

where $$V_{136}=\omega^2 x \div \frac{j\omega z}{R_{151}C_{151}}$$

and $$g_b=\frac{j\omega R_{151}C_{151}}{1+j\omega R_{151}C_{151}}$$

and the voltage from lead 156 is made proportional to $$V_{156}=3V_{136}R_{151}C_{151} \quad (23)$$

Adding $V_{154}$ and $V_{156}$ as given above and working through the necessary algebraic transformations, it is found that:

$$V_{154}+V_{156}=3j\omega x-\omega^2 x R_{152}C_{152}=3\frac{dx}{dt}+R_{152}C_{152}\frac{d^2x}{dt^2} \quad (24)$$

which, when combined with the signal $$\frac{X}{R_{152}C_{152}}$$

from lead 153 and passed through filter 152 and modulator 129 produces the desired output $$\frac{dx}{dt}$$

This operation is understood more readily if it is seen that the acceleration component required in the input of filter 152 is obtained by passing $V_{136}$ through filter 151 of the type shown in Fig. 4 and the velocity component is obtained by passing $V_{136}$ through a filter of the type shown in Fig. 3 with the same time constant as filter 151. Remembering that $g_b=1-g_a$ relates the transfer functions of these two filters, a person skilled in the art can readily derive the algebraic relation required to determine the relative magnitude of the signals fed to amplifier 142. The advantage of this particular method of deriving the velocity reference signal $$\frac{dx}{dt}$$

is that only a single filter is required, as in Fig. 16, yet the signal $$3S \sin \theta = 3\frac{dx}{dt}$$

required in Fig. 16 is derived from $V_{136}$, the same source used to derive the acceleration reference signal, and is free of transient errors due to skids and slips. The result is thus the same as though a signal from modulator 131 had been introduced at both terminals 34 and 81 in the more complicated filter of Fig. 16.

A method for deriving the displacement reference signal $x$ which is simpler than the method of Fig. 22 is shown in Fig. 26 also. A signal proportional to $x$ is obtained directly from the localizer receiver 27 through modulator 128 and is combined in amplifier 144 with reference velocity signal from modulator 129, rectified in phase detector 137, filtered in low pass filter 157, and converted to A. C. in modulator 132. The relative strengths of the two signals are adjusted by gain controls in amplifier 144 so that filter 157 receives a signal proportional to $x$ from modulator 128 and a signal proportional to $$R_{157}C_{157}\frac{dx}{dt}$$

from modulator 129. The output of filter 157 is thus given by:

$$V_{157}=(x+j\omega x R_{157}C_{157})\frac{1}{1+j\omega R_{157}C_{157}}=x \quad (25)$$

It is clear that only the low frequency components of $x$ are obtained directly from modulator 128 through filter 157. The higher frequency components come from the output of filter 152, but only the low frequency components in the output of 152 are derived from modulator 128. Thus the arrangement of Fig. 26 constitutes one of the many ways in which the object of this invention can be accomplished and only the low frequency components of the reference displacement signal and the reference velocity signal are obtained from the radio signal, the higher frequency components being obtained from other sources, in this case the gyro compass and artificial horizon. The acceleration reference signal is obtained by a relatively simple method without reference to the radio signal or an accelerometer but depends on a foreknowledge of the flight characteristics of the airplane and is in error only during a change of wind velocity or direction.

The arrangement of Fig. 26 incorporates a conventional arrangement for deriving steering signals from the three derived reference signals which are combined additively in amplifier 146 and converted to direct current in rectifier 138. The signal from 138 is made available at terminals 158 and may be connected to a pilot's control indicator in the form of a zero-center meter or to an automatic pilot circuit, since this signal indicates by its magnitude and direction the correction required in the controls affecting the transverse acceleration of the aircraft to make the aircraft approach and remain on the beam. For this purpose, limiter 147 limits the displacement signal so that the rate of approach required does not exceed a certain fixed value, and limiter 148 limits the combined displacement and velocity signals so that the acceleration required to reduce the voltage at terminals 158 does not exceed safe limits. Thus the plane will not be banked excessively.

Obviously, too, each low-pass section as in Fig. 3 could be replaced by a lag device of the same characteristic equation. One form of lag device is the thermal lag device shown in Fig. 19. This consists of two temperature-sensitive resistive elements 106 and 107 arranged in a bridge circuit with a fixed-voltage source 108 so that the output voltage 109 depends on temperature unbalance in the two elements. Each element is provided with a heater winding 111 and 112, respectively, which are arranged in another bridge circuit with a fixed source of heater power 113 so that the input voltage E can unbalance the rate of heating of the two elements 111 and 112. After a lag determined by the thermal capacity of the system, the heat radiated from each element 106 and 107 comes into equilibrium with that supplied from its heater and the difference in the temperature of the two elements 106 and 107 results in an output voltage $V_{109}$ proportional to the input voltage E. Because of the exponential approach to temperature equilibrium, E bears the same relation to $V_{109}$ in Fig. 19 as it does in the low pass filter shown in Fig. 3.

Similarly, just as the output of the high-pass filter or lead network of Fig. 4 is equal to the difference between the input and output voltage of the lag network or low-pass filter of Figure 3, a lead or high-pass filter section can be constructed as in Figure 20 by taking the difference between the input and output voltage of the system of Figure 19 to obtain $V_{114}$.

Figure 25:
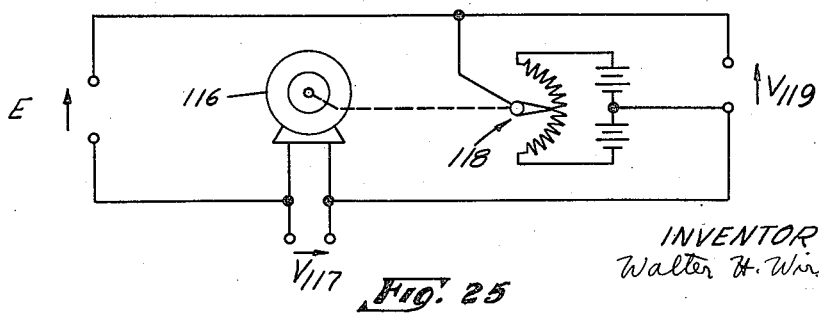
Fig. 25 illustrates a mechanical filter apparatus which may act as either a low pass or a high pass filter.

A mechanical filter is shown in Figure 25. Here servomotor 116 is arranged to run at a speed proportional to its input voltage $V_{117}$ and drives a potentiometer 118 and the output voltage $V_{119}$ is applied to terminals 117. The output voltage $V_{119}$ is equal to the output voltage $V_L$ of a low-pass filter section. The motor input voltage is the difference between the applied voltage E and the output voltage $V_{119}$. Hence the potentiometer comes into equilibrium in exponential fashion as required to simulate the low pass filter shown in Fig. 3. The voltage E minus $V_{119}$ applied to the motor may be applied to output terminals 117 which produce the desired output when the device is to be used as a high-pass filter section or lead network.

Thus, while there are many devices and electrical networks which can produce the same or analogous results as the low-pass and high-pass filter sections used to illustrate an embodiment of this invention, the principles of this invention are made clear in the foregoing description and mathematical analysis and in the accompanying drawings.

It is seen, therefore, that this invention provides means for obtaining signals proportional to $x$, $$\frac{dx}{dt} \text{ and } \frac{dx^2}{dt^2}$$

in a very accurate manner by deriving the low frequency components of the signals from radio receiving means and the middle and higher frequencies from means including a lateral accelerometer, a rate of turn gyro, a turn and bank gyro, and the compass.

Although this invention has been described with respect to a preferred embodiment thereof, it is not to be so limited since changes and modifications may be made therein which are within the full intended scope of the invention as defined by the appended claims.

I claim:

1. A system for controlling the flight of an aircraft so as to approach and coincide with a beam of radiant energy transmitted from the ground comprising, aircraft control means, a receiver responsive to energy from said beam, instrument means independent of said receiver, deviation deriving means receiving signals from said receiver and from said instrument means and producing a deviation signal proportional to the deviation of the aircraft from the beam, velocity deriving means receiving signals from said receiver and said instrument means and producing a velocity signal proportional to the velocity of the aircraft perpendicular to the beam, acceleration deriving means receiving a signal from said receiver and said instrument means and producing an acceleration signal proportional to the acceleration of the aircraft perpendicular to the beam, said deviation deriving means, velocity deriving means, and acceleration deriving means obtaining the unidirectional and relatively low frequency components from the receiver and obtaining the relatively higher frequency components from the instrument means, and said aircraft control means receiving said deviation, velocity and acceleration signals to control the flight of the aircraft.

2. Means for obtaining a velocity signal proportional to the velocity of an aircraft perpendicular to a beam of radiant energy wherein the low frequency and high frequency components of the velocity signal are obtained from different sources, comprising a receiver responsive to energy from the beam, directional means responsive to the angular relation between the direction of travel of the aircraft with respect to the surrounding air and the axis of the beam, co-ordinating means receiving a signal from said receiver and a signal from said directional means to give a velocity signal wherein the unidirectional and low frequency components of said velocity signal are obtained from said receiver and the higher frequency components are obtained from said directional means.

3. In a system for controlling the flight of an aircraft so as to approach and coincide with a beam, a mechanism for obtaining a signal proportional to the velocity of the aircraft perpendicular to the beam comprising a radiant energy receiver for receiving energy transmitted from a stationary beam-defining transmitter, differentiating means receiving the output of said receiver, a low pass filter receiving the output of said differentiating means, directional means deriving a signal proportional to the transverse velocity of the aircraft with respect to the surrounding air, a high pass filter receiving the output of said directional means, and the output of the low pass and high pass filters connected together to obtain a signal equal to the velocity of the aircraft perpendicular to the beam.

4. A system according to claim 3 wherein the signal equal to the velocity of the aircraft perpendicular to the beam is combined with a signal equal to the aircraft's deviation from the beam and a signal proportional to the aircraft's acceleration perpendicular to the beam, by means including, a steering computer which receives the output from both filters, a rate of turn gyro furnishing a rate of turn signal to said steering computer, said radiant energy receiver furnishing a signal to said steering computer, and said steering computer giving an output proportional to the required steering correction.

5. An aircraft control system wherein it is desired to bring an aircraft to and maintain it on a beam of radiant energy comprising, a receiver responsive to radiant energy from the beam, an amplifier connected to said receiver, directional means deriving a signal proportional to the velocity of the aircraft perpendicular to the beam with respect to surrounding air, a high pass filter receiving the combined outputs of said amplifier and said directional means, a steering computer receiving the outputs of said high pass filter, a rate of turn gyro furnishing a rate of turn signal to said steering computer, said steering computer receiving a signal from said receiver and deriving an output proportional to the required steering correction.

6. A means for obtaining a velocity signal proportional to the velocity of an aircraft perpendicular to a beam of radiant energy comprising, a receiver responsive to energy from the beam, an accelerometer responsive to the aircraft's acceleration perpendicular to the beam, velocity deriving means receiving a signal from said receiver and a signal from said accelerometer to obtain a velocity signal wherein the unidirectional and low frequency components of said velocity signal are obtained from the receiver and the higher frequency components are obtained from the accelerometer.

7. In a system for controlling the flight of an aircraft so as to approach and coincide with a beam, a mechanism for obtaining a signal proportional to the velocity of the aircraft perpendicular to the beam comprising a receiver for receiving energy transmitted from a beam-defining transmitter, a high pass filter receiving the output of said receiver, an accelerometer furnishing a signal to a low pass filter, and velocity deriving means receiving the output of said high pass and low pass filters combined to obtain a signal proportional to the velocity of the aircraft perpendicular to the beam.

8. In a system for controlling the flight of an aircraft so as to approach and coincide with a beam, a mechanism for obtaining a signal proportional to the velocity of the aircraft perpendicular to the beam comprising a receiver for receiving energy transmitted from a beam-defining transmitter, an amplifier receiving the output of said receiver, a high pass filter receiving the output of said amplifier, rate of turn gyro-pick-off means furnishing a signal to a low pass filter, and velocity deriving means receiving the outputs of said high pass and low pass filters combined to obtain a signal proportional to the lateral velocity of the aircraft perpendicular to the beam.

9. In a system according to claim 6 wherein signal proportional to the velocity of the aircraft perpendicular to the beam is combined with a signal proportional to the aircraft's deviation from the beam, and a signal proportional to the aircraft's acceleration perpendicular to the beam by means including, a steering computer which receives the output of said velocity deriving means, a signal from said rate of turn gyro pick-off means, and a signal from said receiver to produce an output proportional to the required steering correction.

10. A means for obtaining a velocity signal proportional to the velocity of an aircraft perpendicular to a beam of radiant energy comprising, a bank angle indicating device, a receiver responsive to energy from the beam, a low pass filter receiving a signal from said bank angle indicating device, a high pass filter receiving a signal from said receiver, and velocity deriving means receiving the outputs of said high pass and low pass filters combined to give an output proportional to the velocity of the aircraft perpendicular to the beam.

11. A means for obtaining a velocity signal proportional to the velocity of an aircraft perpendicular to a beam including an accelerometer responsive to the acceleration of the aircraft perpendicular to the beam, a receiver responsive to radiant energy from the beam, a low pass filter receiving a signal from said accelerometer, a high pass filter receiving a signal from said receiver, and velocity deriving means receiving the outputs of said low pass and high pass filters combined to give a signal proportional to the aircraft's velocity perpendicular to the beam.

12. Means for obtaining a signal proportional to the velocity of an aircraft perpendicular to a beam of radiant energy comprising, a receiver responsive to energy from the beam, an accelerometer furnishing a first and second output with the first output equal to one-third the second output, a two section low pass filter receiving said second output, a band pass filter receiving said first output and a signal from said receiver, and velocity deriving means receiving the outputs of said filters.

13. Means for obtaining a signal proportional to the velocity of an aircraft perpendicular to a beam comprising, a receiver responsive to radiant energy from the beam, an accelerometer furnishing an output proportional to the aircraft's acceleration perpendicular to the beam, directional means responsive to the angular relation between the direction of travel of the aircraft with respect to the surrounding air and the axis of the beam, a band pass filter receiving an output from said receiver, the accelerometer and said directional means and furnishing an output proportional to the aircraft's velocity perpendicular to the beam.

14. Means for obtaining a signal proportional to the velocity of an aircraft perpendicular to a beam of radiant energy including a receiver responsive to radiant energy from the beam, directional means responsive to the angular relation between the direction of travel of the aircraft with respect to the surrounding air and the axis of the beam, a band pass filter receiving a signal from the receiver and a first output from said directional means, an amplifier receiving a second output from said directional means, a two section high pass filter receiving the output of said amplifier, and means combining the outputs of the band pass filter and the two section high pass filter to obtain a signal proportional to the velocity of the aircraft perpendicular to the beam.

15. Means for obtaining a signal proportional to the acceleration of an aircraft perpendicular to a beam of radiant energy comprising, a receiver responsive to radiant energy from the beam, an accelerometer producing a plurality of signals, directional means producing a plurality of signals, acceleration deriving means receiving a signal from said receiver and a plurality of other signals obtained from said accelerometer and said directional means to produce an output equal to the aircraft's acceleration perpendicular to the beam.

16. Means for obtaining a signal proportional to the acceleration of an aircraft perpendicular to a beam of radiant energy comprising, an accelerometer, a first output of said accelerometer furnished to a two section high pass filter, a second output from said accelerometer furnished to a band pass filter, a radiant energy receiver receiving radiant energy from the beam, the output of said receiver furnished to said two section high pass filter, and means combining the outputs of the two filters to obtain a signal equal to the acceleration of the aircraft perpendicular to the beam.

17. Means for obtaining a signal proportional to the acceleration of an aircraft perpendicular to a beam of radiant energy comprising an accelerometer, directional means furnishing an output proportional to the velocity of the aircraft perpendicular to the beam with respect to the surrounding air, a radiant energy receiver receiving radiant energy from the beam, a two section high pass filter receiving an output from the accelerometer, the directional means, and the receiver to give an output equal to the acceleration of the aircraft perpendicular to the beam.

18. Means for obtaining a signal proportional to the aircraft's deviation from a beam of radiant energy comprising, a radiant energy receiver responsive to radiant energy from the beam, an accelerometer obtaining an output proportional to the aircraft's acceleration perpendicular to the beam, a two section low pass filter receiving the outputs of said accelerometer and said receiver, an amplifier receiving an output from said receiver, a band pass filter receiving the output of said amplifier, and the output of said two section low pass filter combined with the output of said band pass filter to obtain a signal equal to the aircraft's deviation from the beam.

19. A system for controlling the flight of an aircraft so as to approach and coincide with a beam comprising a receiver for the reception of radiant energy transmitted from a stationary beam-defining transmitter, a reference signal computer which receives the output of said receiver, aircraft control means, a plurality of gyroscopic orientation devices carried on said aircraft, a plurality of signals from said gyroscopic orientation devices furnished to said reference signal computer, a steering signal computer furnished the output of the reference signal computer, and the output of said steering signal computer fed to said aircraft control means.

20. A system for controlling the flight of an aircraft so as to approach and coincide with a beam comprising aircraft control means, a receiver for the reception of radiant energy from the beam producing a first signal, a reference signal computer, an accelerometer which produces a second signal proportional to the aircraft's acceleration perpendicular to the beam, gyroscopic orientation means which produce a third signal proportional to the orientation of the aircraft with respect to a plurality of major axes, said reference signal computer receiving said first, second and third signals, a steering signal computer which receives the output from said reference signal computer, and said aircraft control means fed the output from said steering signal computer.

21. A system for controlling the flight of an aircraft so as to approach and coincide with a beam comprising, aircraft control means, a receiver for receiving radiant energy transmitted from a stationary glide path transmitter, an accelerometer which produces a first signal proportional to the aircraft's vertical acceleration, gyroscopic orientation means which produce a second signal proportional to the orientation of the aircraft with respect to a plurality of major axes, a reference signal computer which receives the first and second signals and the output of said receiver, said reference signal computer deriving signals proportional to the deviation of the aircraft from the glide path, the vertical velocity of the aircraft and the vertical acceleration of the aircraft, steering signal computer means receiving the signals from the reference signal computer and combining and converting said signals to vertical attitude correcting signals, and said aircraft control means receiving the attitude correcting signals.

22. A system for controlling the flight of an aircraft so as to approach and coincide with a beam comprising, aircraft control means, a receiver responsive to radiant energy transmitted from a beam defining localizer transmitter, an accelerometer which produces a first signal proportional to the aircraft's acceleration perpendicular to the beam, gyroscopic orientation means which produce a second signal proportional to the orientation of the aircraft with respect to a plurality of major axes, a reference signal computer which combines said first and second signals with the output from said receiver, said reference signal computer deriving a plurality of signals proportional to the deviation of the aircraft from the beam, the lateral velocity of the aircraft with respect to the beam and the lateral acceleration of the aircraft, steering signal computer means furnished the output of said reference signal computer, and said aircraft control means furnished the output of said steering signal computer.

23. A system for controlling the flight of an aircraft so as to approach and coincide with a beam comprising, aircraft control means, radiant energy receiving means, an accelerometer, gyroscopic and magnetic orientation indicating devices, a reference signal computer which is fed the output from said receiver, the accelerometer, and said orientation indicating devices, said reference signal computer calculating a first signal proportional to the aircraft's deviation from the beam, a second signal proportional to the first derivative with respect to time of said first signal, and a third signal proportional to the second derivative with respect to time of said first signal, steering computing means receiving said first, second, and third signals and combining them to give an output proportional to the required steering correction, and said aircraft control means receiving the output of said steering signal computer and correcting the aircraft's attitude in response thereto.

24. Means for obtaining a signal proportional to the velocity of an aircraft perpendicular to a beam of radiant energy, comprising, a receiver responsive to radiant energy from the beam, directional means responsive to the angular relation between the direction of travel of the aircraft with respect to the surrounding air and the axis of the beam, a band pass filter receiving a signal from said receiver and a signal from said directional means, a two section low pass filter receiving a signal from said directional means, and means combining the output of said band pass filter with the output of said two section low pass filter.

25. Means for obtaining a signal proportional to the acceleration of an aircraft perpendicular to a beam of radiant energy comprising, directional means responsive to the angular relation between the longitudinal axis of the aircraft and the axis of the beam, differentiating means receiving a signal from said directional means, a low pass filter receiving the output of said differentiating means, roll-axis-gyroscopic means, a high pass filter receiving a signal from the roll-axis gyroscopic means, and the output of said low pass filter and said high pass filter combined to obtain a signal equal to the acceleration of the aircraft perpendicular to the beam.

26. Means for obtaining a signal proportional to the acceleration of an aircraft perpendicular to a beam of radiant energy comprising, directional means responsive to the angular relation between the longitudinal axis of the aircraft and the axis of the beam, roll-axis gyroscopic means, a high pass filter receiving a signal from said roll-axis gyroscopic means and a signal from said directional means to obtain an output signal proportional to the acceleration of the aircraft perpendicular to the beam.

27. Means for obtaining a signal proportional to the velocity of an aircraft perpendicular to a beam of radiant energy comprising, a receiver responsive to radiant energy from the beam, directional means responsive to the angular relation between the longitudinal axis of the aircraft and the axis of the beam, roll-axis gyroscopic means, a high pass filter receiving signals from said directional means and said gyroscopic means, a band pass filter receiving a signal from said receiver, a signal from the input of said high pass filter and a signal from the output of said high pass filter to obtain an output signal proportional to the velocity of the aircraft perpendicular to the beam.

28. Means for obtaining a signal proportional to displacement of an aircraft perpendicular to the beam of radiant energy comprising, a receiver responsive to radiant energy from the beam, velocity deriving means, a low pass filter receiving a signal from said receiver and a signal from said velocity deriving means to obtain an output proportional to the displacement of the aircraft from the beam.

29. A system for controlling the flight of an aircraft so as to approach and coincide with a beam of radiant energy comprising, aircraft control means, a receiver responsive to radiant energy from the beam, directional means responsive to the angular relation between the longitudinal axis of the aircraft and the axis of the beam, roll axis gyroscopic means, a high pass filter receiving a signal from said directional means and a signal from said gyroscopic means, a band pass filter receiving a signal from the receiver, a signal from the output of said high pass filter, and a signal from the input of said high pass filter, a low pass filter receiving a signal from said band pass filter and a signal from the receiver, and said aircraft control means receiving a displacement signal from said low pass filter, a velocity signal from said band pass filter and an acceleration signal from the output of said high pass filter.

30. Means for producing a signal proportional to the displacement of an aircraft from a beam of radiant energy wherein the unidirectional and relatively low frequency components of said displacement signal are obtained from radio receiving means and the relatively higher frequency components are obtained from instrument means carried on said aircraft comprising, first coordinating means receiving a signal from the receiving means and selecting the unidirectional and relatively low frequency components of deviation therefrom, second coordinating means receiving a signal from said instrument means and selecting the relatively higher frequency components of deviation therefrom, and the outputs of said first and second coordinating means combined to obtain a signal proportional to the aircraft's displacement from the beam.

31. Means for producing a signal proportional to the velocity of an aircraft perpendicular to a beam of radiant energy wherein the unidirectional and relatively low frequency components of said velocity signal are obtained from radio receiving means and the relatively higher frequency components are obtained from instrument means carried on said aircraft comprising, first coordinating means receiving a signal from the receiving means and selecting the unidirectional and relatively low frequency components of velocity therefrom, second coordinating means receiving a signal from said instrument means and selecting the relatively higher frequency components of velocity therefrom, and the outputs of said first and second coordinating means combined to obtain a signal proportional to the aircraft's velocity perpendicular to the beam.

32. Means for producing a signal proportional to the acceleration of an aircraft perpendicular to a beam of radiant energy wherein the unidirectional and relatively low frequency components of said acceleration signal are obtained from radio receiving means and the relatively higher frequency components are obtained from instrument means carried on said aircraft comprising, first coordinating means receiving a signal from the receiving means and selecting the unidirectional and relatively low frequency components of acceleration therefrom, second coordinating means receiving a signal from said instrument means and selecting the relatively higher frequency components of acceleration therefrom, and the outputs of said first and second coordinating means combined to obtain a signal proportional to the aircraft's acceleration perpendicular to the beam.

33. A means for obtaining a signal equal to the velocity of an aircraft perpendicular to a beam of radiant energy comprising, a radiant energy receiver for receiving energy transmitted from a beam-defining transmitter, directional means deriving a signal proportional to the velocity of the aircraft perpendicular to the beam with respect to the surrounding air, a high-pass resistance-capacitance filter of time constant RC, an amplifier with a gain equal to $$\frac{1}{RC}$$

connected to said receiver, said high-pass filter receiving the combined outputs of said amplifier and said directional means to obtain a signal equal to the velocity of the aircraft perpendicular to the beam.

WALTER H. WIRKLER.

REFERENCES CITED

The following references are of record in the file of this patent:

UNITED STATES PATENTS

| Number | Name | Date |
|---|---|---|
| 1,703,280 | Minorsky | Feb. 26, 1929 |
| 1,703,317 | Minorsky | Feb. 26, 1929 |
| 2,257,757 | Moseley | Oct. 7, 1941 |
| 2,259,600 | Alkan | Oct. 21, 1941 |
| 2,372,185 | Witthuhns | Mar. 27, 1945 |
| 2,423,337 | Moseley | July 1, 1947 |
| 2,490,660 | Speer | Dec. 6, 1947 |

FOREIGN PATENTS

| Number | Country | Date |
|---|---|---|
| 516,567 | Great Britain | Jan. 5, 1940 |
| 934,544 | France | Jan. 19, 1948 |